United States Patent [19]
Young

[11] 4,090,358
[45] May 23, 1978

[54] HEAT EXCHANGER SUPPORT SYSTEM
[75] Inventor: D. Craig Young, Peoria, Ill.
[73] Assignee: Caterpillar Tractor Co., Peoria, Ill.
[21] Appl. No.: 728,669
[22] Filed: Oct. 1, 1976
[51] Int. Cl.² .............................................. F02C 7/10
[52] U.S. Cl. .............................. 60/39.51 R; 60/39.32; 165/81
[58] Field of Search ....................... 60/39.51 R, 39.32; 165/81, 82, 83

[56] References Cited
U.S. PATENT DOCUMENTS

| 2,355,440 | 8/1944 | Howard | 60/39.32 |
| 3,759,323 | 9/1973 | Dawson et al. | 60/39.51 R |
| 3,968,834 | 7/1976 | Mangus et al. | 60/39.51 R |

Primary Examiner—John J. Vrablik
Assistant Examiner—L. J. Casaregola
Attorney, Agent, or Firm—Phillips, Moore, Weissenberger, Lempio & Majestic

[57] ABSTRACT

A mounting system to interconnect a gas turbine heat exchanger with a gas turbine includes three interconnecting gas manifolds: one to receive cool compressed air from the engine, one to receive hot exhaust gas from the engine, and one to communicate heated intake air to the engine. The manifolds, acting in cooperation with a jointed support arm, allow the heat exchanger and the gas turbine to have differing thermal expansion properties. Specifically, the air-in manifold allows vertical translational motion toward and away from the engine, the gas-in manifold allows for horizontal translational motion, while the air-out manifold positioned between the other manifolds includes a trunnion arrangement allowing rotational motion. The jointed support located at the opposite end of the engine from the air-in manifold and the trunnion arrangement cooperate to control the resultant thermal expansion motion in the air-in manifold and the gas-in manifold.

5 Claims, 13 Drawing Figures

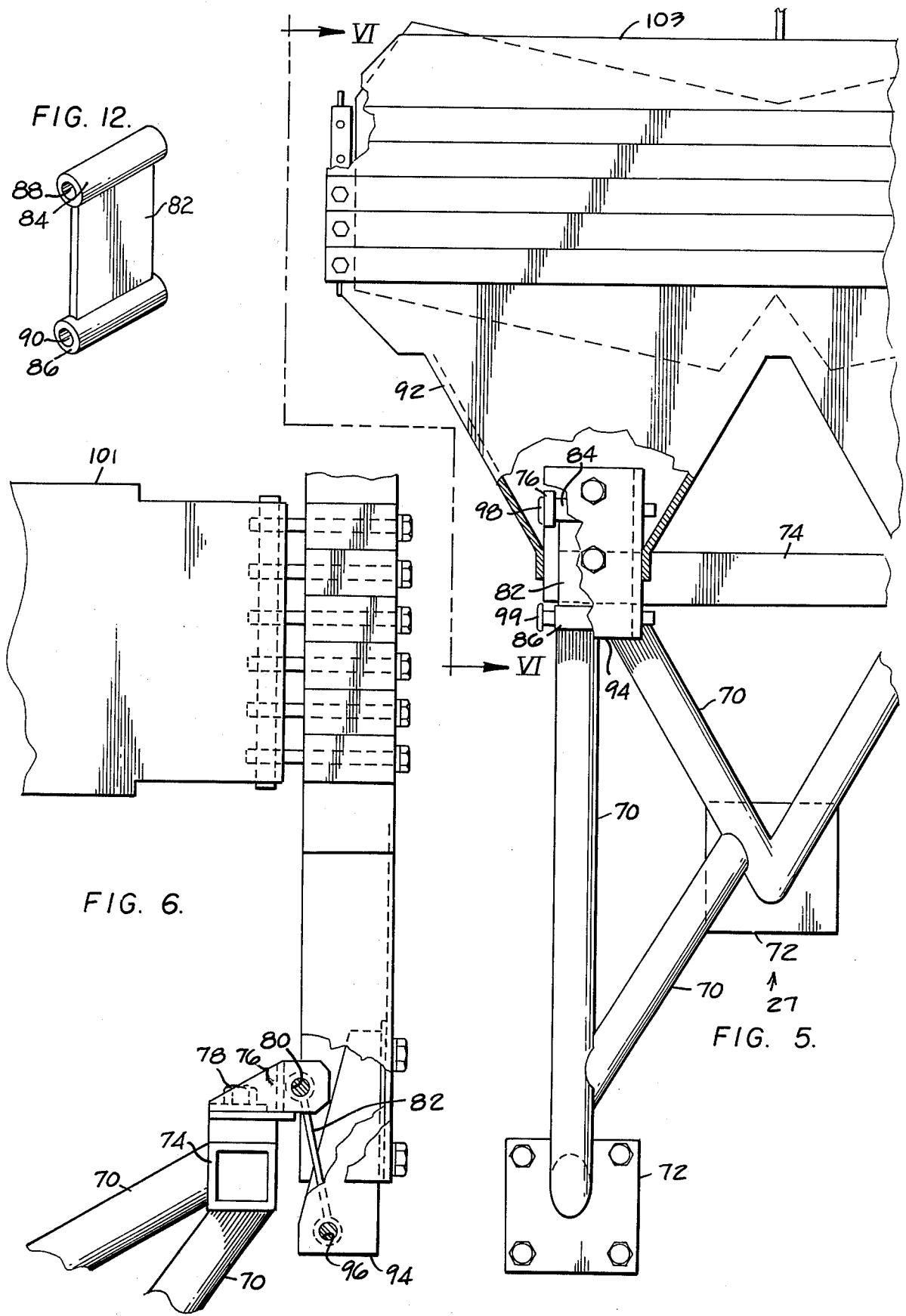

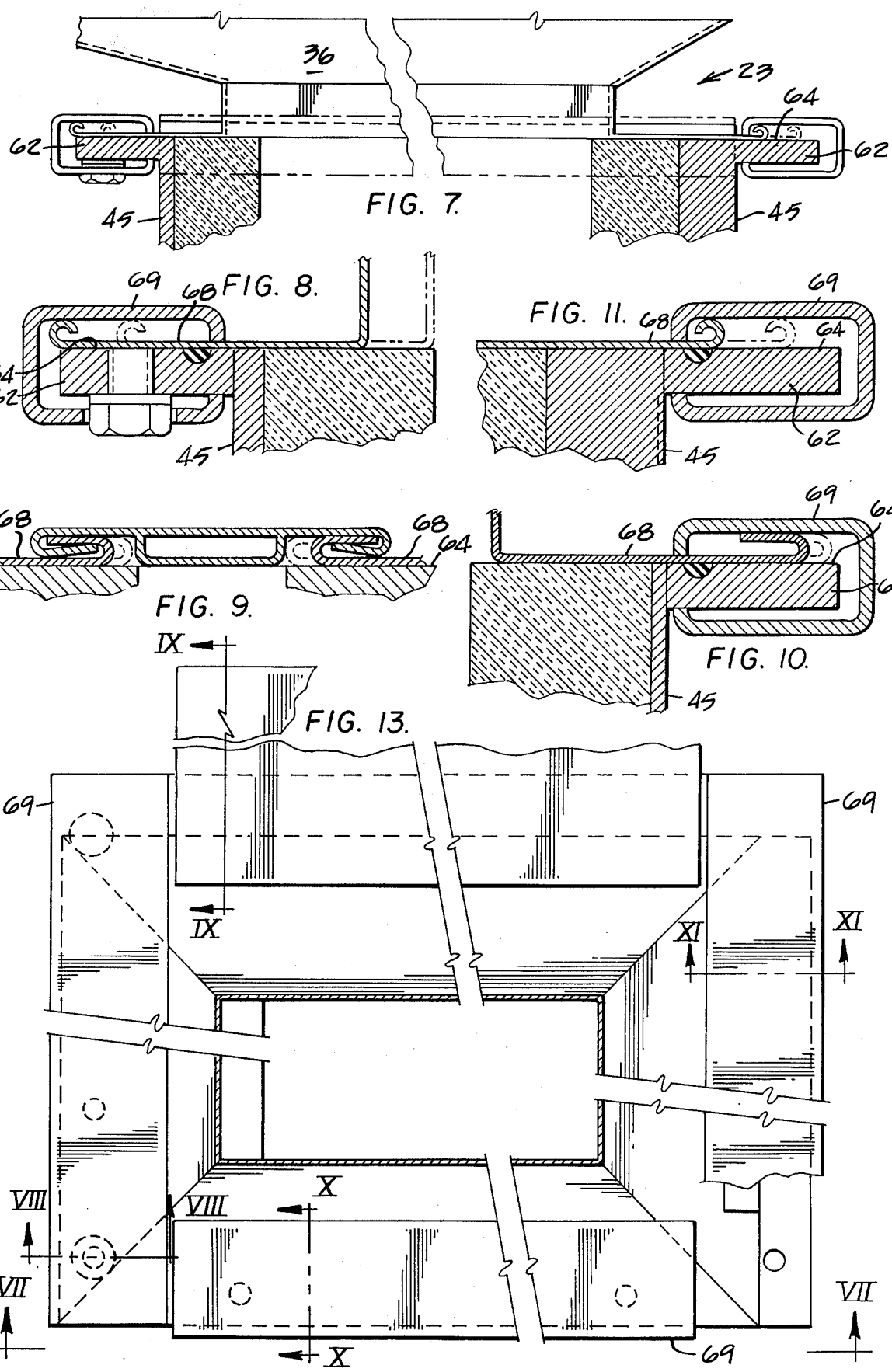

HEAT EXCHANGER SUPPORT SYSTEM

BACKGROUND OF THE INVENTION

This invention relates to a mounting system for a heat exchanger for use on a gas turbine engine.

The use of gas turbine engines in stationary applications and in ground moving vehicles permits the inclusion of a heat exchanger which serves the purpose of heating incoming air by extracting heat from the exhaust gasses. Gas turbine engines operate most efficiently at the higher temperatures, thus preheating the intake air prior to injecting fuel results in a higher output efficiency per pound of fuel burned. Therefore, with the inherent characteristic of high exhaust temperatures in gas turbines, it has become common when weight is not a critical factor to add a heat exchanger to extract excessive heat from exhaust gasses to heat inlet gasses. To increase efficiency even further, it is the normal procedure to heat the inlet gasses subsequent to compression. Thus the inlet gasses are ducted from the compressor section of the engine casing through a heat exchanger and then returned to the engine in the vicinity of the combustion system through a second duct. A third duct interconnects the exhaust from the engine to the heat exchanger. The heat exchanger provides two separate flow paths with the flow paths being separated by thin walls. An example of the heat exchanger contemplated for use in this type engine is described in U.S. Pat. No. 3,759,323.

The material used for construction of the heat exchanger and the material used for construction of the engine generally will have different thermal expansion characteristics, not to mention the fact that there are varying thermal expansion characteristics in the heat exchanger itself. Accordingly, one of the problems in designing a heat exchanger and an associated mounting system for a gas turbine engine has been to overcome the problems inherent in different thermal expansion rates for the two components. In order to achieve the most efficient type heat exchanger, it has been found appropriate to mount the heat exchanger immediately adjacent the engine, generally above the engine. A typical mounting for a heat exchanger adjacent the engine is disclosed in U.S. patent application, Ser. No. 548,112 now U.S. Pat. No. 3,968,834 assigned to the assignee of this invention. The mounting means disclosed therein has proved satisfactory for use in lower horsepower engines but as the horsepower increases the thermal expansion problems increase, particularly in relation to the innerconnecting manifolds between the heat exchanger and the engine. Of the various structures disclosed in the above-mentioned mounting means application, movement between the heat exchanger and the engine generally occurs at all three manifolds; this movement can be both lateral and vertical relative the engine. Fixing the center of the three manifolds when the manifolds are serially placed, results in movement of the other two manifolds in opposite directions as the temperature increases or decreases. Accordingly, a flexible joint must be provided at at least two manifolds and further a second support means provided for the heat exchanger if the fixed manifold is to act as a support means. The second support means must itself be flexible in order to allow motion of the heat exchanger relative the engine. In higher horsepower engines it has been found that fixing a manifold is unsatisfactory as there will always be a certain degree of motion of the manifold itself due to thermal expansion, but to provide two support means neither associated with a manifold has at least two drawbacks. First of all it increases the weight and cost of manufacture of the engine in the design and construction of the second support means and secondly it requires that all three manifolds provide for both vertical and longitudinal movement relative the engine.

A problem which has been encountered in the past in heat exchanger systems utilizing a flexible gas-in duct such as that described in U.S. patent application, Ser. No. 548,112 is reactive pressure loading in the gas-in duct and to a limited extent in the gas-out duct. The increase in pressure caused by the compressed air from the engine being delivered to the heat exchanger results in the bellows type connection in addition to expanding due to heating having a further expansion due to increased pressure in the heat exchanger system itself. The net result of the heat expansion and the reactive pressure loading is to lift the heat exchanger upwardly of the engine case particularly when a three bellows system is utilized. When one of the manifolds acts as a support point, rotation occurs at that support point with expansion due to heat and pressure loading forcing at least one of the other manifolds upwardly away from the engine.

SUMMARY OF THE INVENTION

Accordingly, this invention provides for a heat exchanger mounting system in a gas turbine engine which utilizes one support bracket, and a trunnion mount associated with one of the manifolds. The trunnion mount allows rotational motion in the associated flexible manifold while the support bracket allows a limited degree of translational motion in the heat exchanger fore and aft of the engine. The forwardmost, or air-in manifold is provided with a bellows type expansion joint which allows for translation vertically relative the engine while the rearmost, or gas-in manifold allows translational motion longitudinally of the engine only.

It is an object of this invention to provide a heat exchanger support system for a gas turbine engine which allows for varying thermal expansion properties between the heat exchanger and the gas turbine engine.

It is a further object of this invention to provide a heat exchanger support system wherein at least one of the support points is coincident with one of the manifolds.

It is still a further object of this invention to provide a heat exchanger mounting system in which vertical translational motion is limited substantially to one duct connection.

It is a further object of this invention to provide a heat exchanger support system in which axial or longitudinal motion is limited substantially to one duct connection.

It is another object of this invention to provide a heat exchanger support system which compensates for reactive pressure loading in the gas-in manifold.

It is a further object of this invention to provide a heat exchanger support system which accomplishes the above objects and further accomplishes the object of pressure compensation in the gas-in manifold by the use of compensation bellows.

It is still a further object of this invention to provide a heat exchanger support system in which the second primary point of support is provided by a bracket member.

It is still another object of this invention to provide a heat exchanger support system utilizing the bracket type support member in which a flexible link is provided to control the motions found in the duct connections.

Broadly stated, the invention is a mounting system for interconnecting a first assembly with a second assembly, the first assembly exhausting hot gasses to the second assembly and the second assembly receiving relatively cool compressed gasses from the first assembly. The second assembly provides internal passage means to allow the hot exhaust gasses to heat the relatively cool compressed gasses. The second assembly includes means to deliver the heated gasses back to the first assembly. The mounting system allows for differing thermal expansions in the second assembly and the first assembly and compensates for pressure loading resulting from the reception of the relatively cool compressed gas. The mounting assembly comprises an air-in manifold means for communicating compressed air from the first assembly to the second assembly allowing translational motion of the second assembly toward and away from the first assembly in compensating for differing thermal expansion in the second assembly and reactive pressure loading in said manifold means. The assembly further comprises an air-out manifold means allowing rotational motion about a lateral axis of the assembly and for communicating heated compressed air from the second assembly to the first assembly. The assembly further comprises a gas-in manifold means allowing translational movement in the longitudinal axis of the first and second assemblies and for communicating exhaust gasses from the first assembly to the second assembly. The assembly further comprises a bracket means acting in cooperation with the air-out manifold means to support the second assembly relative the first assembly and for controlling vertical and horizontal motion of the second assembly relative the first assembly. These and other objects of the invention will become apparent from a study of the following description and accompanying drawings.

BRIEF DESCRIPTION OF THE DRAWINGS

The following drawings illustrate in:

FIG. 5 is a rear elevation view of a portion of the heat exchanger mounting means showing particularly the bracket partly in section.

FIG. 6 is a detailed section of the bracket shown in FIG. 5 in a side elevation view.

FIG. 7 is a cross-sectional side elevation view of the gas-in manifold means;

FIG. 8 is a detailed view of a portion of the manifold shown in FIG. 13 at VIII—VIII with the clamp installed;

FIG. 9 is a front elevation of the gas-in manifold connection taken at IX—IX of FIG. 13;

FIG. 10 is a detailed view of the clamp means shown in FIG. 13 at X—X;

FIG. 11 is a detailed view of a portion of the manifold shown in FIG. 13 at XI—XI;

FIG. 12 is an elevation view of the bracket plate used to pivotally connect the heat exchanger with the bracket;

FIG. 13 is a plan view partly in section of the gas-in manifold taken at XIII—XIII of FIG. 7.

DETAILED DESCRIPTION

Figure 1:
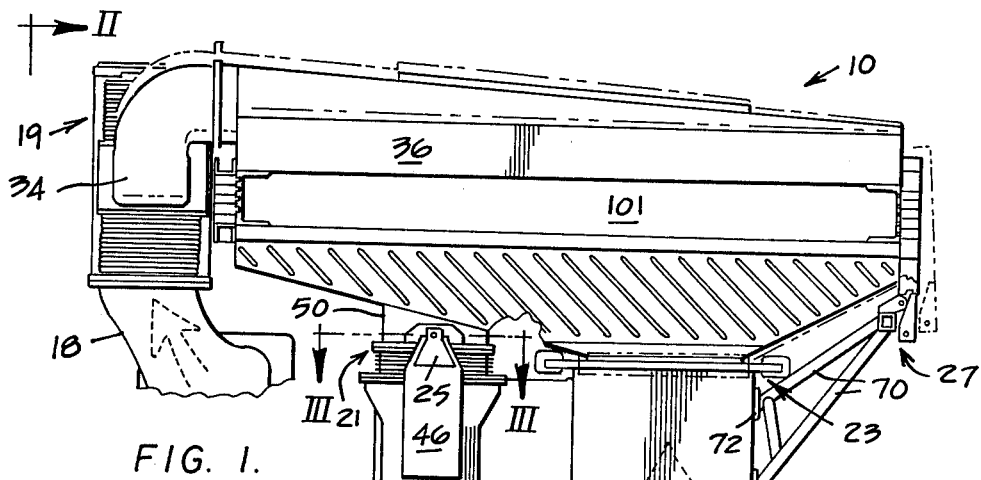
FIG. 1 an elevation view of a mounting system for a heat exchanger in a gas turbine engine incorporating the provisions of this invention.
Figure 3:
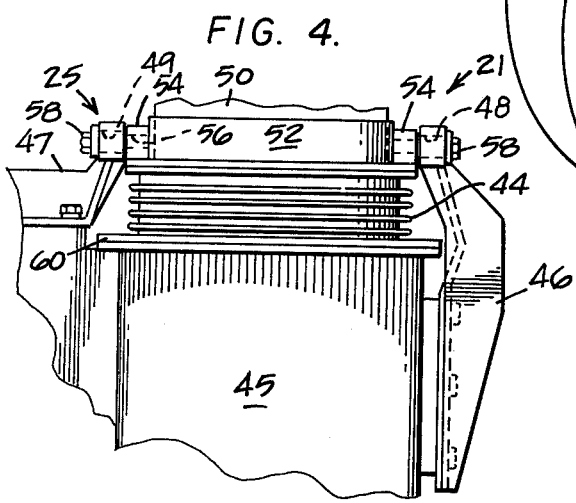
FIG. 3 is a sectional view taken at III—III of FIG. 1 showing the trunnion mount of the air-out manifold.
Figure 2:
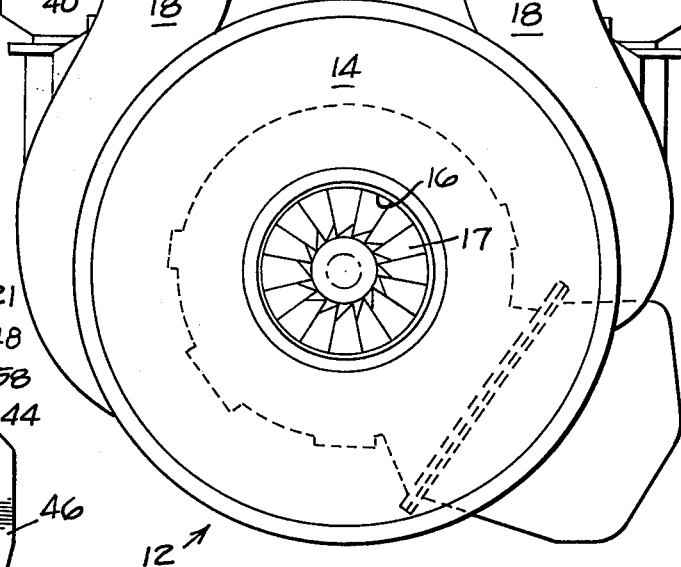
FIG. 2 is a front elevation view of the gas turbine engine with a pair of heat exchangers mounted in accordance with the mounting system described in this invention.

A heat exchanger 10 for a gas turbine engine 12 is shown in FIG. 1 mounted to the gas turbine engine. Referring to FIG. 2, it can be seen that two heat exchangers may be associated with a single gas turbine engine. In FIG. 2, a front elevation view of the gas turbine engine illustrates the ducting from the compressor section to the heat exchanger. Specifically, the gas turbine engine includes a compressor 14 having an air inlet 16 and a compressor turbine such as radial flow turbine 17. It should be understood that the radial flow turbine 17 may be comprised of more than one stage. Compressed air is communicated outwardly of radial flow turbine 17 by a compressor outlet duct 18 which communicates with an air-in manifold means such as the pressure compensating bellows manifold 19.

Air communicated to heat exchanger 10 through pressure compensating bellows manifold 19 is ducted through the cool air side of heat exchanger 10 and communicated outwardly of the heat exchanger through an air-out manifold means such as air-out bellows manifold 21 to a combuster inlet duct of the gas turbine. Hot exhaust gasses from the gas turbine are communicated from a power turbine exhaust to the hot air side of the heat exchanger through a gas-in manifold 23. Support for the heat exchanger is provided generally by a trunnion arrangement 25 associated with the air-out bellows manifold and a support bracket 27 fixedly associated with the gas turbine engine and extending outwardly to the rear to pivotally connect with the heat exchanger. The trunnion mount and the support bracket allow a certain degree of translational movement in the heat exchanger, specifically vertical translatory motion occurs in the pressure compensating bellows manifold while horizontal translatory motion occurs in gas-in manifold 23.

Referring to FIG. 2 for a detailed description of pressure compensating bellows manifold 19 it can be seen that the manifold is formed in a cruciform shape with the vertical member comprised of an upper bellows 30 and a lower bellows 32. The horozintal member 34 extends outwardly thence rearwardly and upwardly as shown in FIG. 1 to interconnect with the heat exchanger body 36. The pressure compensating bellows 19 is contained between an upper member 38 and duct 18 wherein it is affixed by conventional means well known in the art, such as by flange 40. Interconnecting upper member 38 and lower flange 40 are a plurality of rod members 42. Upper bellows and lower bellows 32 are respectively fixed to upper member 38 and flange 40 at their outer extremities while the facing ends of upper bellows 30 and lower bellows 32 are affixed by means well known in the art to horozintal member 34. The structure of the upper and lower bellows permits a limited degree of translatory vertical motion to horizontal member 34 while retaining the gas tight integrity of the duct system interconnecting duct 18 with the heat exchanger body 36. In particular, thermal creep in the heat exchanger body 36 which causes horizontal member 34 to move vertically away from the gas turbine causes lower bellows 32 to expand and upper bellows 30 to contract. In earlier gas turbine engines, the action of compressed air in duct 18 tended to cause the counterpart of horizontal member 34 to rise abnormally relative the thermal creep inherent in the heat exchanger body because of pressure acting on horizontal member 34 and internally of bellows 32. This invention adds an upper bellows 30 in which the pressure may be dissipated against upper member 38 while allowing both the upper and lower bellows to expand in a response to the thermal creep. Thus, the overall movement of the heat exchanger 10 away from a gas turbine engine is substantially reduced.

Figure 4:
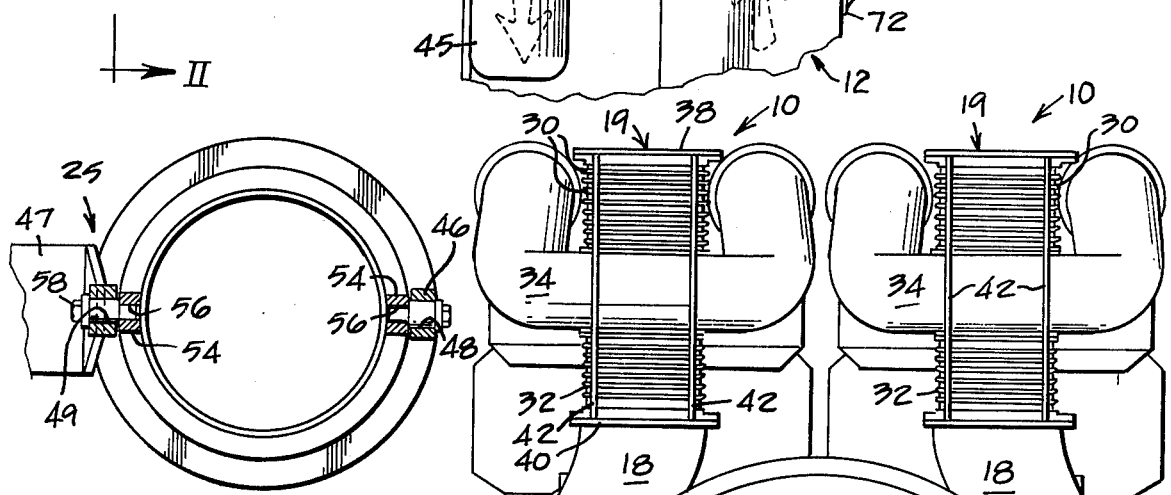
FIG. 4 is a front elevation view of the trunnion mount shown in FIG. 3.

Trunnion mount 25 which is shown in more detail in FIG. 4 also incorporates a bellows 44 which allows movement between heat exchanger 10 and the associated gas turbine engine. Affixed to the exterior of turbine casing 45 is a first support arm 46 and a second support arm 47 located on diametrically opposite sides of the air-out duct and forming the fixed portion of trunnion mount 25. Formed at first and second ends of support arms 46 and 47 are bores 48 and 49 respectively. Disposed between bellows 44 and heat exchanger body 36 is a rigid duct 50 having a collar 52 formed at the end adjacent bellows 44 for the purpose of interconnecting bellows 44 with duct 50 and further to provide a mounting base for the pivoting member of trunnion mount 25. Specifically, collar 52 has integrally formed therewith two diametrically opposed projections 54 each defining a radially oriented bore 56 adapted to receive a pivot pin 58 which may take the form of a bolt in which case either bore 48 and 49 or bores 56 could be formed with internal threads to threadably receive the pivot pin 58, or pin 58 could be retained by some other means. Bellows 44 has formed at the end extreme of collar 52 a flange 60 adapted to be affixed to turbine casing 45 in the vicinity of an air inlet duct therein.

Gas-in manifold 23, as noted above, allows translatory motion between turbine casing 45 and the heat exchanger 10. Details of the interconnection between heat exchanger 10 and turbine casing 45 are depicted in FIG. 7 in elevation wherein the sheet metal of heat exchanger body 36 in the vicinity of gas-in manifold 23 is shown. Turbine casing 45 has formed therewith a flange 62 which forms a horizontal flat surface 64 relative turbine casing 45 upon which a corresponding flat surface of heat exchanger body 36 may rest. Heat exchanger body 36 defines an interconnecting duct which has integrally formed therewith a flange 68 adapted to rest on flat surface 64. Details of clamp 69 and the structure of flat surface 64 in relation to flange 68 are contained in a copending application. Suffice it to say the purpose of the structure herein described is to allow translational motion in the direction of the arrow shown in FIG. 7 of heat exchanger body 36 relative the engine casing. Referring to FIGS. 8, 9 and 11, the phantom view of flange 68 is shown in an approximate position it would take during operation of the engine.

Bracket 27 is shown in detail in FIG. 5 to indicate the pivotal motion thereof. Bracket 27 comprises a plurality of cantilevered arms 70 affixed by plate members 72 to turbine housing 45 by conventional means such as bolts and having at the opposite ends thereof a horizontally oriented bar 74. A bracket 76 is affixed to the upper surface of bar 74 by appropriate fastening means such as bolt 78. Bracket 76 defines a horizontally oriented mounting hole 80. A plate shaped link member 82 serves to pivotally connect heat exchanger body 36 with bracket 27. Plate 82 which is shown in detail in FIG. 12 has integrally formed therewith at either end cylindrical members 84 and 86, each defining therethrough a bore 88 and 90 respectively. Heat exchanger body 36 defines mounting means for interconnecting with plate 82 such as a triangular projection 92 which has affixed at its lower extremity a bracket 94 which defines a horizontally oriented mounting hole 96. Mounting hole 80 and mounting hole 96 are thus substantially parallel when the heat exchanger is mounted on the engine. Both bracket 76 and bracket 94 have opposing faces spatially separated sufficiently to allow plate 82 to be disposed therebetween so that a pin 98 may be placed through mounting holes 80 and 88 and a corresponding pin 99 inserted through mounting hole 96 and hole 90 in plate 82 to pivotally fix the rearward end of heat exchanger body 36 to bracket 27.

The structure of heat exchanger body 74 which is shown in part in FIGS. 5 and 6 is covered in greater detail in U.S. Pat. application, Ser. No. 548,112 assigned to the assignee of this invention. For purposes of this invention it is sufficient to understand that heat exchanger body 36 includes a pair of side beams 101 and an end beam 103 to which triangular member 92 is affixed. Side members 101 and 103 resist the internal pressure resulting from thermal expansion in the heat exchanger itself and also serve to support the heat exchanger.

In operation the mounting system disclosed herein allows a certain degree of thermal expansion in the heat exchanger body 36 without adversely affecting gas flow into and out of the heat exchanger body. Specifically referring to FIG. 1, the approximate location of the heat exchanger body at operating temperature is shown by the phantom lines. Specifically, it should be noted that as the temperature of heat exchanger body 36 increases, horizontal member 34 of the pressure compensating bellows manifold 19 will move upwardly toward upper member 38. Such movement is shown in FIG. 1 by the phantom line. Similarly as the temperature of heat exchanger body 36 increases, axial movement occurs at gas-in manifold 23 as described above and depicted in FIG. 7 through FIG. 11. The axial motion in gas-in manifold 23 and the vertical translational motion in pressure compensating bellows 19 are thus controlled in trunnion mounting 21 which allows rotation and by bracket mount 27 which permits translation.

Although this invention has been described in relation to a specific embodiment, it is to be understood that minor modifications may be made thereto without departing from the scope and spirit of the invention.

What is claimed is:

1. A mounting system for interconnecting a gas turbine engine with a heat exchanger allowing differing thermal expansion in said heat exchanger and said gas turbine engine, said heat exchanger including a first compartment and a second compartment, the mounting system comprising;
air-in manifold means allowing translational motion of the heat exchanger towards and away from said gas turbine engine for communicating relatively cool gases exhausted from said gas turbine engine to said first compartment;
air-out manifold means allowing rotational motion of said heat exchanger about a lateral axis relative said gas turbine engine and said heat exchanger for communicating said relatively cool gases from said first compartment to said gas turbine engine;

gas-in manifold means allowing translational movement in the longitudinal axis of said gas turbine engine and said heat exchanger for communicating exhaust gases from said gas turbine engine to said second compartment;

and bracket means acting in cooperation with the air-out manifold means for limiting vertical and horizontal motion of said heat exchanger.

2. The mounting means as set forth in claim 1 wherein said air-in manifold means comprises:
   a first bellows communicating with the gas turbine engine;
   a hollow horizontal member affixed on one side to said first bellows distal of said engine and communicating with the first compartment of the heat exchanger;
   a second bellows affixed to the other side of the horizontal member;
   a plate member affixed to the opposite end of said second bellows;
   a plurality of rods rigidly affixing said plate member relative said engine whereby said horizontal member is allowed to move relatively toward and away from said engine while communicating compressed gasses from said first bellows to said heat exchanger.

3. The heat exchanger mounting system as set forth in claim 2 wherein said air-out manifold means comprises:
   a trunnion mounting assembly including a pair of diametrically opposed pivot mounting brackets;
   a collar member affixed to said heat exchanger;
   a bellows assembly interconnecting said collar member with said gas turbine; and
   a pair of pivot pins rigidly affixed to said collar member and pivotally mounted in said pivot brackets whereby said heat exchanger is allowed to rotate about said pivot member in the lateral axis.

4. The mounting system as set forth in claim 3 wherein said bracket means comprises:
   a plurality of cantilever arms extending rearwardly and outwardly of said turbine engine;
   a laterally disposed mounting arm rigidly affixed to said cantilevered arms;
   a pivotal plate member pivotally mounted between said arm and said heat exchanger.

5. In a heat exchanger mounting system for a gas turbine engine, the gas turbine engine having a compressor outlet duct, a combuster inlet duct, and a power turbine exhaust serially aligned along the longitudinal axis thereof; and the heat exchanger unit comprising an elongated body having opposed upper and lower surfaces, an air-in manifold integrally connected to one end thereof, an air-out manifold and a gas-in manifold integrally formed in the one side adjacent the engine body; the mounting system comprising:
   linked bracket support means for supporting the second other end of the heat exchanger unit relative the engine;
   trunnion connection means for pivotally joining the air-out manifold with the combustor inlet duct;
   compensating bellows means for joining the air-in manifold with the compressor outlet duct, said compensating bellows means allowing limited vertical translational motion of the heat exchanger relative the engine; and
   clamp means for joining the gas-in manifold with the power turbine exhaust, said clamp means allowing limited horizontal translational motion of the heat exchanger relative the engine;
   the link bracket support means acting in cooperation with the trunnion connection means for controlling the vertical translational motion in the compensating bellows means and the horizontal translational motion in the clamp means.

* * * * *